US011191004B2

(12) United States Patent
Ramle et al.

(10) Patent No.: US 11,191,004 B2
(45) Date of Patent: Nov. 30, 2021

(54) METHOD AND NODES FOR MOBILITY ON DEMAND ENFORCEMENTS

(71) Applicant: Telefonaktiebolaget LM Ericsson (publ), Stockholm (SE)

(72) Inventors: Peter Ramle, Mölnlycke (SE); Josefin Karlsson, Torslanda (SE); Lasse Olsson, Träslövsläge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/301,035

(22) PCT Filed: May 12, 2017

(86) PCT No.: PCT/EP2017/061497
§ 371 (c)(1),
(2) Date: Nov. 13, 2018

(87) PCT Pub. No.: WO2017/194755
PCT Pub. Date: Nov. 16, 2017

(65) Prior Publication Data
US 2019/0200280 A1 Jun. 27, 2019

Related U.S. Application Data

(60) Provisional application No. 62/336,053, filed on May 13, 2016.

(51) Int. Cl.
*H04W 48/04* (2009.01)
*H04W 48/00* (2009.01)
(Continued)

(52) U.S. Cl.
CPC ............ *H04W 48/04* (2013.01); *H04W 8/02* (2013.01); *H04W 8/14* (2013.01); *H04W 48/00* (2013.01);
(Continued)

(58) Field of Classification Search
CPC ..... H04W 8/183; H04W 36/30; H04W 48/04; H04W 8/02; H04W 8/14; H04W 48/00;
(Continued)

(56) References Cited

U.S. PATENT DOCUMENTS 8,750,221 B2   6/2014 Zembutsu et al.
2008/0207260 A1   8/2008 Dent
(Continued)

FOREIGN PATENT DOCUMENTS

CN   1898982 A   1/2007
CN   102752829 A   10/2012
(Continued)

OTHER PUBLICATIONS

3GPP TS 23.501 V0.4.0 (Apr. 2017); 3rd Generation Partnership Project; Technical Specification Group Services and System Aspects; System Architecture for the 5G System; Stage 2 (Release 15), (Apr. 2017). (124 pages).

(Continued)

*Primary Examiner* — Charles N Appiah
*Assistant Examiner* — Frank E Donado
(74) *Attorney, Agent, or Firm* — Rothwell, Figg, Ernst & Manbeck, P.C.

(57) ABSTRACT

The embodiments herein relate to a method for mobility enforcement performed by a control entity. The method comprises receiving a first control plane transmitted by a wireless communication device, WCD; and in response to receiving the first control plane message obtaining mobility information for the WCD. The mobility information for the WCD identifying at least one of: a set of one or more allowed regions. a set of one or more allowed radio access technologies, RATs, and a set of one or more access points. The method further comprising transmitting to the WCD a response message, said response message identifying at least (Continued)

one of: the set of allowed regions, the set of allowed RATs, and the set of one or more access points. The embodiments herein relate to a control entity performing the method, a corresponding method performed by a wireless communication device, WCD, and a corresponding WCD.

16 Claims, 13 Drawing Sheets

(51) Int. Cl.
| | |
|---|---|
| *H04W 48/14* | (2009.01) |
| *H04W 8/02* | (2009.01) |
| *H04W 8/14* | (2009.01) |
| *H04W 60/04* | (2009.01) |
| *H04W 36/00* | (2009.01) |
| *H04W 8/18* | (2009.01) |

(52) U.S. Cl.
CPC ........... *H04W 48/14* (2013.01); *H04W 60/04* (2013.01); *H04W 8/18* (2013.01); *H04W 36/00835* (2018.08)

(58) Field of Classification Search
CPC ................. H04W 48/14; H04W 60/04; H04W 36/00835; H04W 8/18
USPC ....................................... 455/432.1
See application file for complete search history.

(56) References Cited

U.S. PATENT DOCUMENTS

| | | | |
|---|---|---|---|
| 2010/0007567 A1 | 3/2010 | Wu | |
| 2010/0075670 A1 | 3/2010 | Wu | |
| 2012/0009937 A1* | 1/2012 | Daly ............... | H04W 4/021 455/456.1 |
| 2012/0129488 A1* | 5/2012 | Patterson .......... | H04M 15/50 455/406 |
| 2013/0003656 A1* | 1/2013 | Cho ................. | H04W 48/04 370/328 |
| 2015/0133124 A1* | 5/2015 | Lim ................. | H04W 36/04 455/436 |
| 2016/0112916 A1* | 4/2016 | Kim ................. | H04W 64/00 455/436 |
| 2016/0183156 A1* | 6/2016 | Chin ............... | H04W 36/0022 370/331 |

FOREIGN PATENT DOCUMENTS

| | | |
|---|---|---|
| CN | 103281775 A | 9/2013 |
| CN | 104080074 A | 10/2014 |
| EP | 2 485 505 A1 | 8/2012 |
| RU | 2 444 146 C2 | 2/2012 |
| WO | 2008/122323 A2 | 10/2008 |
| WO | 2009/072956 A1 | 6/2009 |

OTHER PUBLICATIONS

Russian Office Action dated Jul. 5, 2019 issued in Russian Application No. 2018144036. (12 pages).
International Search Report and Written Opinion dated Jun. 23, 2017 issued in International Application No. PCT/EP2017/061497. (9 pages).
3GPP SA WG2 Meeting #116, S2-163273, Jul. 11-15, 2016, Vienna, Austria; Ericsson, "Update of solution on 'Mobility levels using Mobility and Session classes'". (5 pages).
3GPP TST CT WG1 Meeting #55bis, C1-083911, Phoenix, Arizona, "Clarification on update of Allowed CSG List". Oct. 6-10, 2008 (3 pages).
3GPP TR 23.799 v0.4.0 (Apr. 27, 2016) (96 pages).
S2-161782, "Core Network Architecture & Functional Allocation," Ericsson, Apr. 11-15, 2016, Sophia Antipolis, France (available at http://www.3gpp.org/ftp/tsg_sa/WG2_Arch/TSGS2_114_Sophia_Antipolis/Docs/S2-161782.zip) (7 Pages).
Japan First Office Action dated Sep. 27, 2019 issued in Japan Application No. 2018-556318. (11 pages).
SA WG2 Meeting #114 (S2-161471), "Mobility on Demand architecture aspects", Sophia Antipolis, France (Apr. 11-15, 2016), (4 pages).
SA WG2 Meeting #114 (S2-161665), "Solution for updating the Level of Mobility", Sophia Antipolis, France (Apr. 11-15, 2016) (3 pages).
SA WG2 Meeting #114 (S2-161727), "Solution for on demand mobility support", Sophia Antipolis, France (Apr. 11-15, 2016), (6 pages).
SA WG2 Meeting #S2-114 (S2-161625), "Solution: Mobility Options", Sophia Antipolis, France (Apr. 11-15, 2016), (5 pages).
SA WG2 Meeting #116 (S2-163273), "Update of solution on 'Mobility levels using Mobility and Session classes'", Vienna, Austria (Jul. 11-15, 2016), (6 pages).

* cited by examiner

METHOD AND NODES FOR MOBILITY ON DEMAND ENFORCEMENTS

CROSS REFERENCE TO RELATED APPLICATION(S)

This application is a 35 U.S.C. § 371 National Stage of International Patent Application No. PCT/EP2017/061497, filed May 12, 2017, designating the United States and claiming priority to U.S. provisional application no. 62/336,053, filed on May 13, 2016, which provisional application is incorporated by this reference.

TECHNICAL FIELD

Disclosed herein are, for example, methods and network nodes for mobility on demand enforcements.

BACKGROUND

The next generation networks need a solution for supporting mobility on demand (MOD) for different levels of mobility. Current network technologies provide little to no MOD services at all. Accordingly, network resources are inefficiently used, thereby degrading network performance. Examples of different levels of mobility support include: support over a given area within a single RAN node (such as a cell of an eNodeB), support within a single RAN node (such as an eNodeB), support in a UE registration area (such as a TA in EPC), support in the service area of a control plane or user plane CN entity (such as an MME pool area or a Serving GW service area in EPC), support within a given RAT or combination of RATs integrated on the RAN level (such as LTE and 5G RAT), support between two access technologies.

FIG. 1 illustrates a high level network architecture for next generation networks. At a high level, a UE is connected to a data network via a core node and a radio access node (RAN). FIGS. 2-4 illustrate example network architectures. For example, FIG. 1 illustrates an example of a high-level functional reference architecture, FIG. 2 illustrates an example of a distributed user plane deployment, non-roaming architecture, and FIG. 3 illustrates an example of a roaming (home-routed) architecture.

NG Subscriber Data Management (Next generation SDM or SDM) is the subscription information storage node storing information for the subscribers of the operator. When a subscriber connects to the network, subscription information is retrieved from the SDM. In a roaming scenario the serving operator retrieves subscription information located in the home operator's network.

SUMMARY

Currently, there is no efficient solution in 3GPP addressing how to only allow access for a UE in only parts of the serving nodes service area. Furthermore, there is no efficient solution on how to instruct the RAN to initiate handover only into the allowed area(s). Additionally, there is no solution on how to instruct the RAN to only initiate handover for a selective set of PDU sessions, or a solution by which a UE selectively in connected mode may request setup of connections for PDU sessions not yet in connected mode. For MOD, the purpose is to allow, for example, Internet of Things (IoT) stationary devices and fixed wireless access (FWA) devices in smaller areas, which would require a very extensive configuration effort with the existing features.

In one aspect there is provided a method for mobility enforcement. In some embodiments the method includes a control node receiving a first control plane message (e.g. Attach request with or without PDN connectivity request, Tracking Area Update (TAU), Service Request, etc.) transmitted by a wireless communication device (WCD). The method further includes the control node performing a procedure in response to receiving the first control plane message. In some embodiments, the procedure includes the control node obtaining mobility information (e.g., a whitelist listing allowed Tracking Areas (TAs), cells, radio access network (RAN) coverage areas, and/or access points or a blacklist listing forbidden TAs, cells, RAN coverage areas, and/or access points) for the WCD, said mobility information for the WCD identifying (directly or indirectly) at least one of: a set of one or more allowed regions (one or more TAs, one or more cells, one or more access node coverage areas), a set of one or more allowed radio access technologies (RATs), and a set of one or more access points. The procedure further includes transmitting to the WCD a response message, said response message identifying (directly or indirectly) at least one of: the set of allowed regions, the set of allowed RATs, and the set of one or more access points.

In some embodiments, the step of obtaining the mobility information comprises obtaining authorized mobility information from a policy node. In some embodiments, the step of obtaining the authorized mobility information from the policy node comprises: obtaining subscriber information associated with the WCD, said subscriber information comprising (or consisting of) baseline mobility information; forwarding to the policy node a request for the authorized mobility information, said request for the authorized mobility information comprising the obtained subscriber information, wherein the policy node is configured to generate the authorized mobility information (e.g., policy node may generate the authorized mobility information by selecting authorized mobility information using a policy and context information); and receiving from the policy node the authorized mobility information.

In some embodiments, the obtained mobility information is baseline mobility information, and the step of obtaining the mobility information comprises obtaining subscription information for the WCD, wherein the subscription information comprises baseline mobility information. In such an embodiment, the step of obtaining the mobility information may further comprises transmitting to a policy node the obtained subscription information for the WCD and then receiving from the policy node the mobility information.

In some embodiments, the subscriber information comprises: baseline mobility management (MM) information identifying one of a predefined set of MM classes; and baseline session management (SM) information identifying one of a predefined set of SM classes; and the mobility information comprises: MM information identifying an authorized MM class; and SM information identifying one or more authorized SM classes.

In some embodiments, the method further comprises the policy node selecting an authorized SM class for a PDN connection currently set up for the WCD, and the mobility information includes an SM class identifier that identifies said selected SM class for the PDN connection. In some embodiments, the step of selecting an authorized SM class for a PDN connection currently set up for the WCD comprises performing the selection based on context information. The context information may include one or more of: location information identifying location of the WCD and time-of-day information identifying the current time of day.

In some embodiments, the procedure further comprises transmitting to a RAN node currently serving the WCD a message identifying (directly or indirectly) at least one of: the set of allowed regions, the set of allowed RATs, and the set of one or more access points.

In some embodiments, the WCD is currently using at least one PDN connection, said PDN connection being associated with a set of one or more PDU sessions, the obtained mobility information comprises an authorized SM class for the PDN connection, and the procedure further comprises: determining whether the SM class for the PDN connection is particular SM class, and as a result of determining that the SM class for the PDN connection is the particular SM class, transmitting to a RAN node a message indicating that pre-setup of resources at mobility is not required for any of said PDU sessions.

BRIEF DESCRIPTION OF THE DRAWINGS

The accompanying drawings, which are incorporated herein and form part of the specification, illustrate various embodiments.

Figure 1:
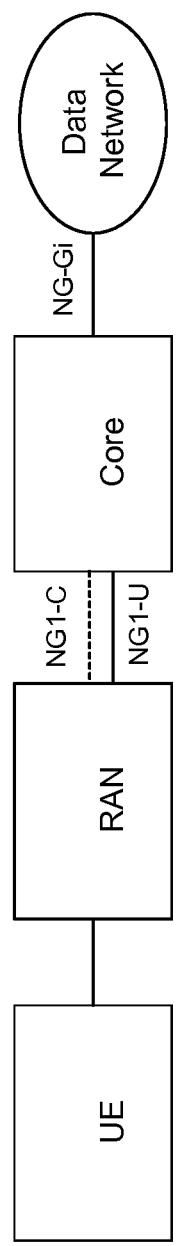
FIGS. 1-5 illustrate exemplary wireless communications systems according to some embodiments.
Figure 2:
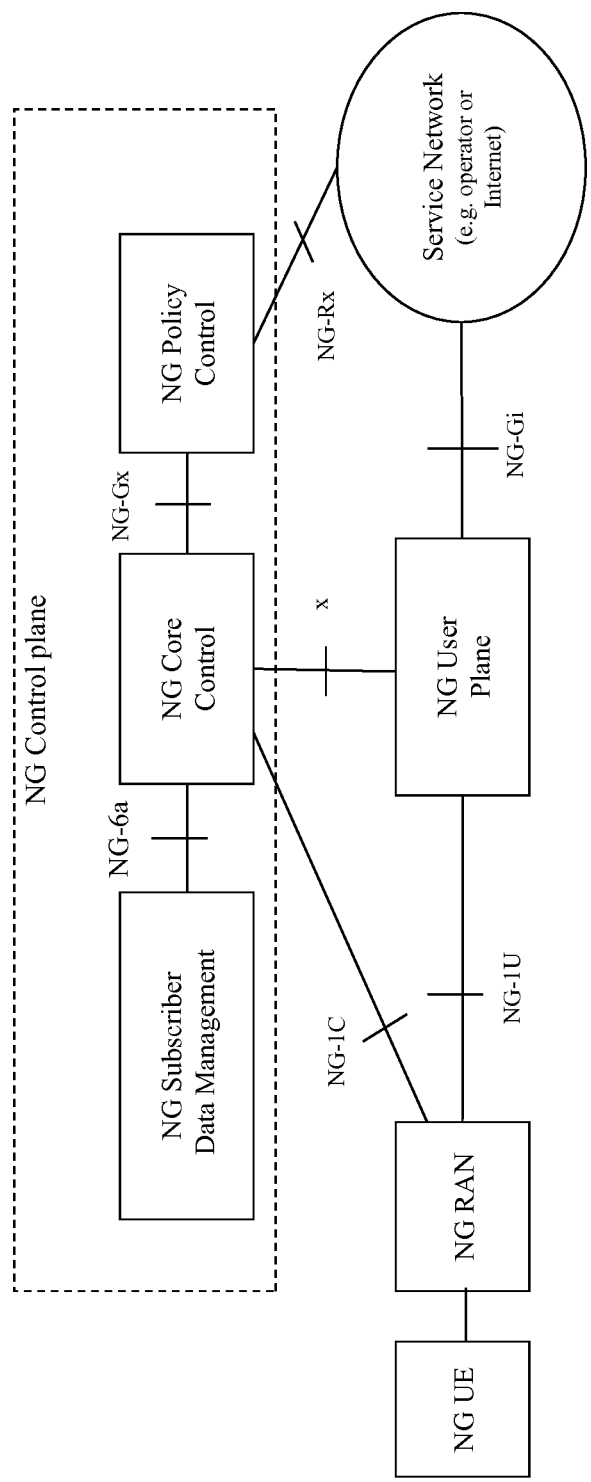
Figure 3:
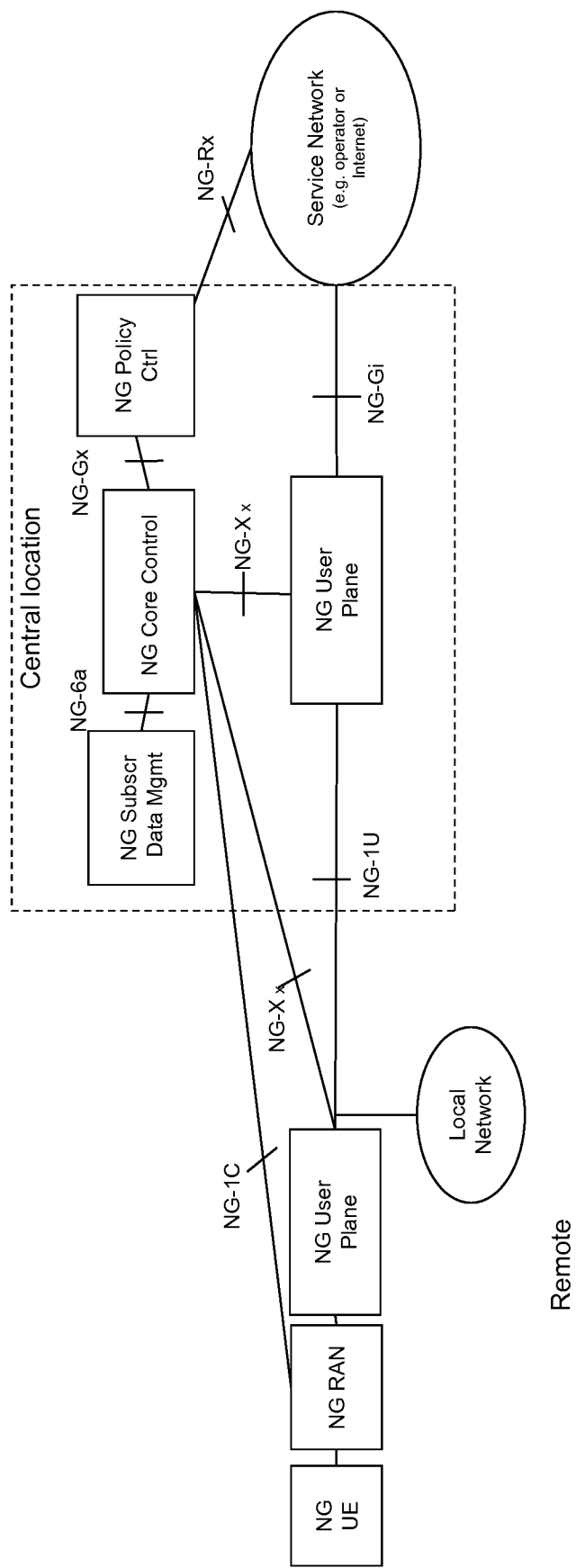
Figure 4:
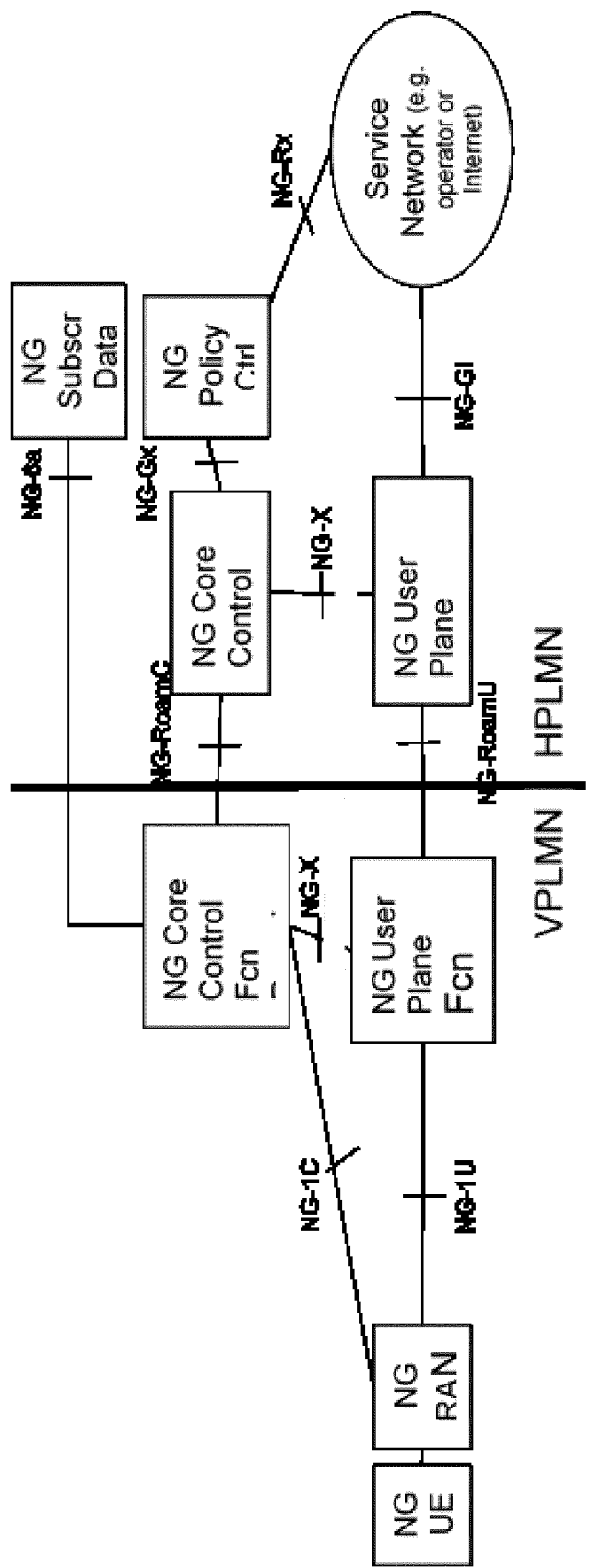

The drawings are not necessarily to scale and the dimensions of certain features may have been exaggerated for the sake of clarity. Emphasis is instead placed upon illustrating the principle of the embodiments herein.

DETAILED DESCRIPTION

According to some embodiments, a mobility on demand scheme includes restrictions on a geographical basis. These restrictions either allow or disallow mobility service for a UE. However, some embodiments do not restrict the amount of mobility, which means that a UE may still induce a required load to the network due to frequent use of mobility procedure within the allowed but although small area. It may be assumed that devices with no or low mobility (e.g. stationary devices or FWA devices) cause less load upon the network as their mobility mainly is caused by changing radio conditions, and thus, with a rather low frequency. Operators may be motivated to base subscription fees upon the imposed geographical restrictions in combination with session level.

In one embodiment, allowed geographical area can be dived into sub-ranges in a decreasing order and mobility management (MM) classes are formed. In some embodiments, an allowed geographical area or allowed region includes, but is not limited to, one or more TAs, one or more cells, or one or more access point coverage areas. An example of an access point coverage area is a coverage area of a RAN node such as a base station or a Wi-Fi access point.

An example of a MM class is an unlimited (or high) mobility class, which places no restrictions upon an allowed geographical area. As an example, legacy mobile broadband (MBB) users may be assigned the unlimited mobility class. Another example of a MM class is a medium mobility class, where the allowed geographical area is limited. For example, the medium mobility class may be used for nomadic DSL replacement (e.g., one area for residence place and one area for summer house). Another example of a MM class is a low mobility class, where the allowed geographical area is further limited with respect to the medium mobility class. For example, the low mobility class may be used for stationary subscribers. Due to shifting radio conditions, the radio coverage may vary, and thereby the serving Cell or TA may shift. Accordingly, a few TAs is thereby anticipated even for a stationary device. Another example of a MM class is a no mobility class, where the allowed geographical area is limited to only one geographical area. As an example, the no mobility class maybe used for users accessing the network only via a fixed point.

Embodiments include differentiated session service levels session management (SM) classes. A UE in connected mode may have one or more packet data network (PDN) connections, with each PDN connections having one or more packet data unit (PDU) sessions. In some embodiments, each PDN connection is associated with at least one SM class.

An example of an SM class includes a seamless continuity class, which specifies pre-setup mobility of PDN connections with IP preservation. An example of pre-set up of mobility includes handover of a UE from an old control node to a new control node that transfers PDN connections from the old control node to the new control node. An example of IP preservation includes maintaining a same IP anchor point (e.g., PGW) during handover. Another example of an SM class is a service continuity class, which specifies pre-setup mobility without IP preservation. Another example of an SM class is a session continuity class, which specifies a post-setup mobility with IP preservation. An example of post-setup mobility includes after TAU of a UE from one control node ("previous control node") to another control node ("new control node"), the UE issues a service request to set up of specific PDN connections. These PDN connections may have been previously established when the UE was served by the old control node. Another example of a SM class is a no PDN connection SM class, which specifies that no PDN connection is allowed for the UE.

Figure 5:
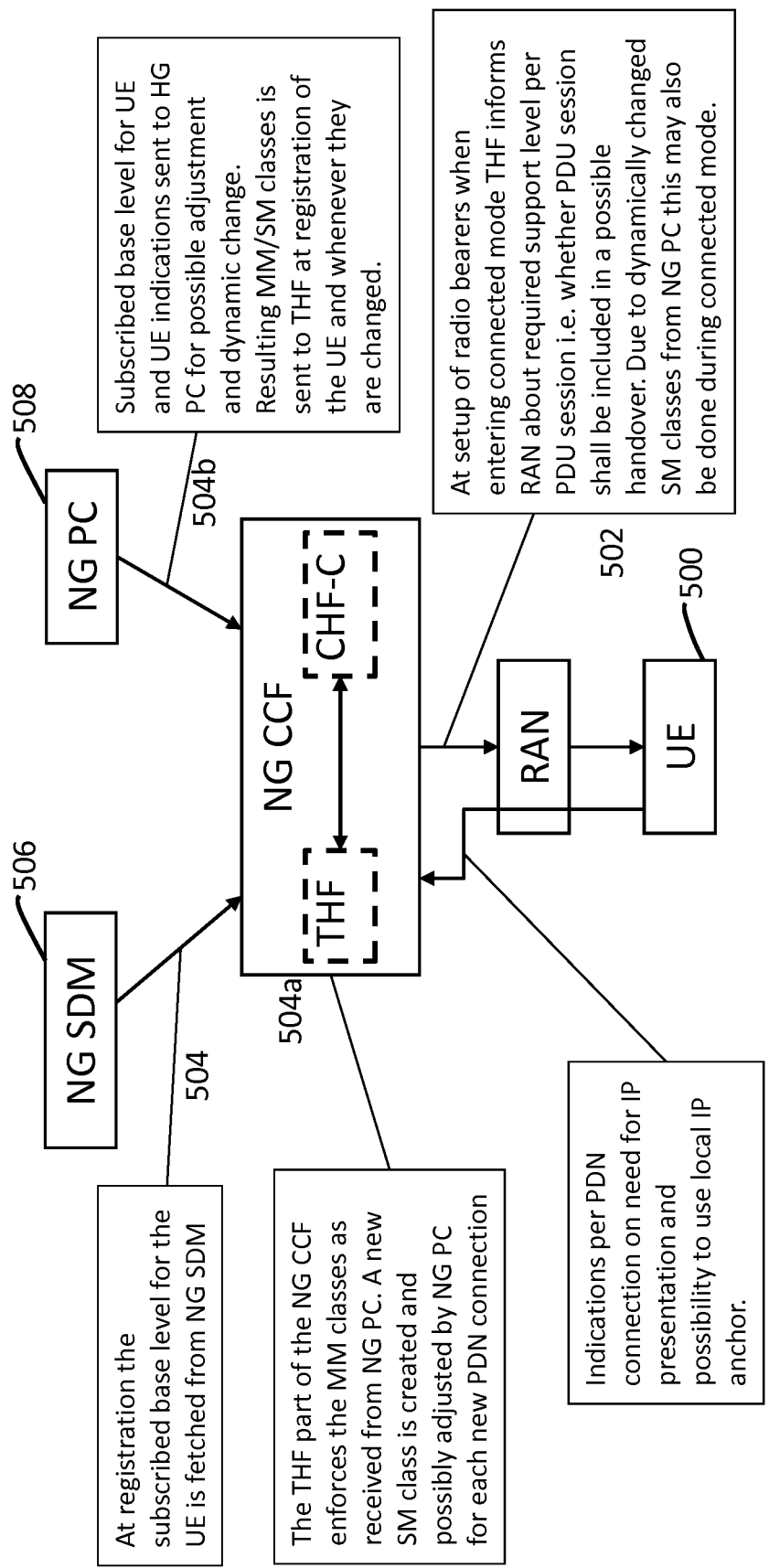

FIG. 5 illustrates an embodiment of a wireless communication system that includes a UE 500, RAN 502, a control node 504 (CCF), a subscriber data management (SDM) node 506, and a policy control (PC) node 508. In some embodiments, the UE is a wireless communication device (WCD) such as a smart phone, tablet, or laptop. In some embodiments, the CCF 504 includes a traffic handling function (THF) 504a and a control handling function control plane (CHF-C) 504b. According to some embodiments, the term node or network node may refer to a single computing device that is configured via software and/or hardware to provide one or more services or a set of computing devices (e.g., a cloud computing system) that are configured via software and/or hardware to function together to provide the one or more services. For example, the software for a control node may be implemented on a single computer or distributed over a plurality of computers. Also, while control node 504, SDM node 506 and PC node 508 are shown as being separate and distinct nodes, this need not be the case as a single node could be configured to provide the functionality described herein of each of the nodes.

In some embodiments, at registration, baseline mobility information for the UE is fetched from the SDM 506 by control node 504. For example, in response to a control plane message, such as an attach request or other control plane message, transmitted by the UE to the control node 504 may obtain from SDM 506 subscription information for the UE that contains the baseline mobility information by, for example, transmitting a request for the UE's subscription information to the SDM 506. The baseline mobility information may include one or more of: a baseline MM class for the UE; a baseline SM class that is applicable to each PDN connection currently used (or that may be used in the future) by the UE; and mobility area (MA) information, which is information that identifies (directly or indirectly) a set of one or more allowed "areas." For example, the MA information may identify (directly or indirectly) at least one of: a set of one or more allowed regions (one or more TAs, one or more cells, one or more access node coverage areas), a set of one or more allowed radio access technologies (RATs), and a set of one or more access points. The MA information may be in the form of a whitelist (i.e., a set of identifiers wherein each identifier directly identifies an allowed area) or a blacklist (i.e., a set of identifies wherein each identifier directly identifies a non-allowed area). In some embodiments, the MA information may also just define the size of the allowed area thereby allowing a dynamically built up of the actual location of the allowed area(s).

In some embodiments, after obtaining the baseline mobility information, the control node 504 sends the baseline mobility information for the UE to the PC node 508 for possible adjustment and dynamic change. That is, for example, control node 504 may send to PC node 508 a request for authorized mobility information, which request includes the baseline mobility information (and possibly also context information). In response to the request, PC node determines authorized mobility information (e.g., an authorized MM class for the UE, which may be different than the baseline MM class, an SM class for each PDN connection used by the UE, each of which may be different than the baseline SM class, and authorized MA information, which may be different than the baseline MA information) and send to the control node the authorized mobility information.

Authorized MM/SM classes may be sent to the THF 504a at registration of the UE and whenever they are changed. The THF 504a may enforce the authorized MM class as received from the PC node 508. A new SM class may be created and possibly adjusted by the PC node 508 for each new PDN connection. In some embodiments, at setup of radio bearers when entering the connected mode, the THF 504a informs the RAN about required support level per PDU session (i.e., whether the PDU session shall be included in a possible handover). Due to dynamically changed SM classes from the PC node 508, this may also be done during connected mode.

In some embodiments, using different service levels for different PDN connections means that all PDN connections shall not necessarily be included in the pre-setup of resources at connected mode mobility. In some embodiments, the THF informs the RAN about the required support (i.e., whether a PDN connection at mobility shall be pre-setup or not). The THF could inform the RAN about the required support at setup of radio bearers when entering connected mode. Since, in some embodiments, the NG PC dynamically may change the MM and SM class, it should also be possible during connected mode to inform the RAN about a changed support level. As a consequence, a UE in connected mode should, after handover is concluded, also be allowed to request setup of radio bearers for specific PDN connections (i.e., those that have not been included in the handover).

Figure 6:
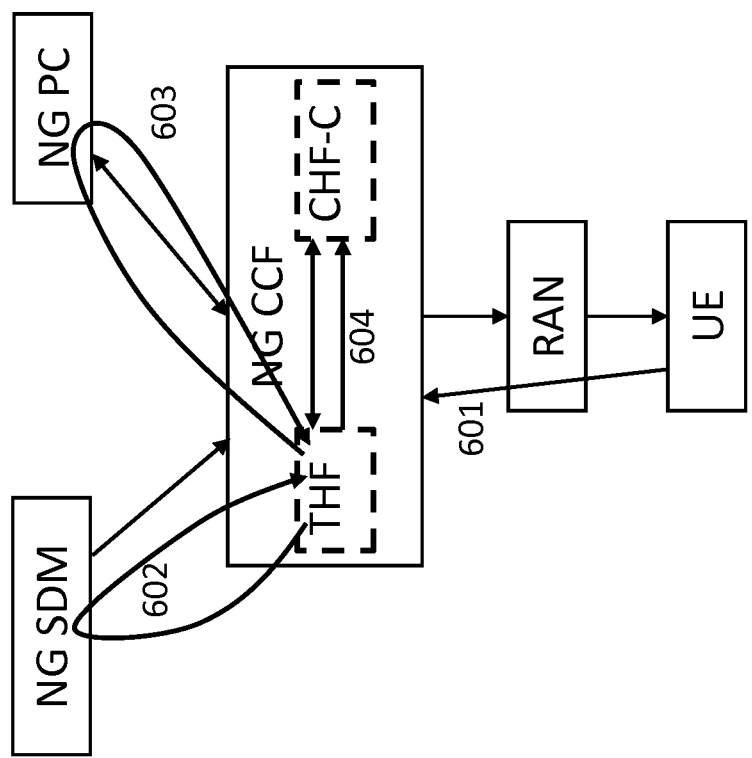
FIG. 6 illustrates an exemplary sequence diagram for a wireless communication system according to some embodiments.

FIG. 6 illustrates an embodiment of a sequence diagram using a wireless communication system such as the system illustrated in FIG. 6.

Step 601. A UE may send IP anchor requirements (e.g., based on service) and UE capabilities (multiple IP Address support during mobility) to the THF.

Step 602. The THF requests the subscribed values (e.g., the baseline mobility information) from the SDM.

Step 603. The THF then sends a request to the PC node for authorized mobility information (e.g., an authorized MM class, an authorized SM class for each PDN connection currently being used by the UE, and/or authorized MA information). The request sent to the PC node for the authorized mobility information may include requested parameters (obtained by THF from the UE) and subscribed values (obtained by THF from SDM) to the PC node. The request to the PC node may also include context information, such as location information identifying the current location of the UE. The PC node then determines the authorized mobility information for the UE (e.g., an authorized MM calls, per PDN authorized SM classes and MA information). The determination may be based on a policy and the context information.

Step 604. The PC node transmits to the control node the determined authorized mobility information. Subsequently, the PC node may detect an ongoing service which in turn might update the authorized SM class for a particular PDN connection. Information identifying the new authorized SM class assigned to the PDN connection will then be sent by the PC node to the control node (e.g. to the CHF-C via the THF) so that the control node can take any appropriate action based on the new authorized SM class assigned to the PDN connection (e.g., the receipt of information identifying the new authorized class for the PDN connection may trigger the control node to transmit to an access point serving the UE a control message comprising information indicating the new authorized SM class and the PDU sessions that are part of the PDN connection to which the new authorized SM class applies).

In some embodiments, for a UE that is only allowed to access the network within non-restricted parts of a service area, the THF may inform the UE about the allowed areas (TAs, cells, access point coverage areas, access points, etc.). The THF may obtain the allowed area information from the MA information included in the subscription information for the UE or from a PC node, as described above. As an example, a list of allowed areas may be sent to the UE as a white list or black list at initial registration of the UE in the THF (i.e. at Attach or inter TAU accept). In this example, unnecessary registration attempts could be avoided. In some embodiments, a whitelist gives the allowed geographical areas, and a blacklist gives the restricted geographical areas.

For a UE in connected mode having only PDN connections with service level session continuity, pre-setup of resources at mobility is not required. For such cases, the THF shall inform the RAN that pre-setup of these resources is not allowed, thus not triggering, for example, handover. For the 'No mobility' SM class, the THF may use a whitelist within a HRL (Handover Restriction List) to inform the RAN that handover is only allowed within a TAI-list area. In another example, informing the RAN about an allowed area could also be used for Low and Medium mobility enforcement.

In some embodiments, the THF may also inform a RAN about the allowed areas. That is, just as THF may send a whitelist or blacklist to the UE identifying (directly or indirectly) the allowed areas for the UE, the THF may send to the RAN node a whitelist or blacklist identifying (directly or indirectly) the allowed areas for the UE. In some embodiments, the above described enforcement is also applicable for a roaming subscriber.

Figure 7:
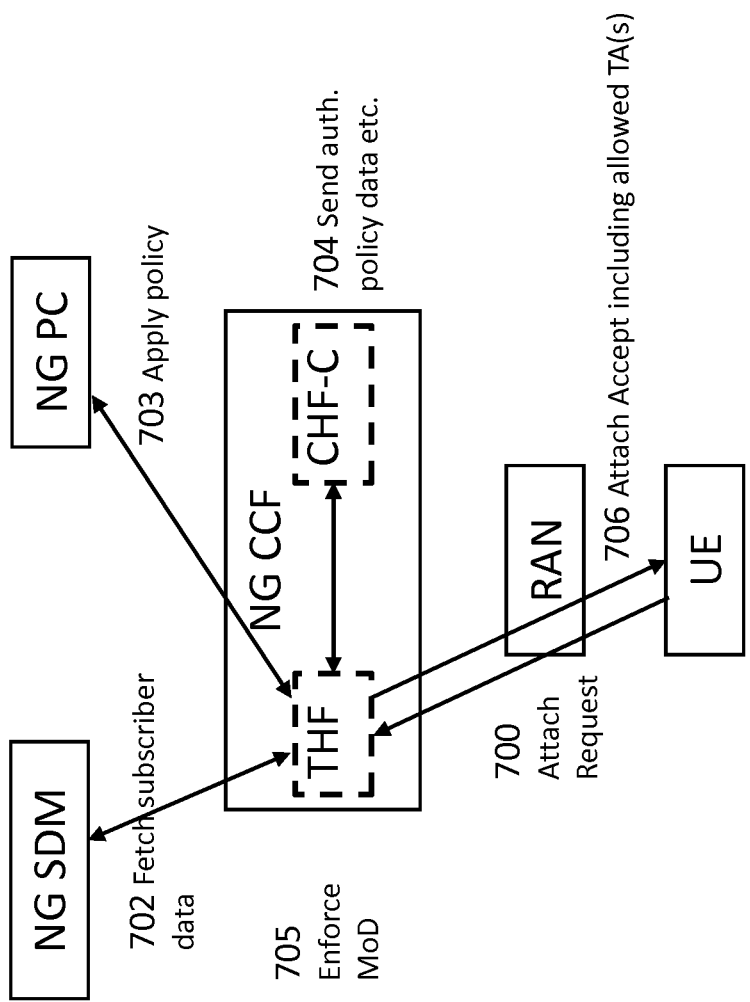
FIGS. 7-9 illustrate exemplary sequence diagrams for a wireless communication system according to some embodiments.

FIG. 7 illustrates an embodiment of a sequence diagram for usage of MM class and SM class for area restriction control of an IoT UE at Attach. For example, FIG. 7 illustrates how the MM class and SM class is used when an IoT UE connects to the network in Attach procedure.

Step. 700. The Attach Request is terminated in THF in the CCF.

Step 702. The subscription information for the UE is fetched from the SDM which may include one or more of: a baseline MM class, a baseline SM class, and baseline MA information.

Step 703. The THF requests the PC node for a possible policy to be applied and the authorized values are sent back to the THF. The request sent in step 703 to PC node may include the subscription information obtained in step 702 (e.g., the obtained baseline MM class, SM class and MA information).

Step 704. The THF sends the authorized values to the CHF-C and the THF enforces the authorized Mobility on Demand (MoD) information (i.e., authorized MM class and/or authorized SM class).

Step 705. The MoD information is enforced.

Step 706. The THF sends the Attach Accept message to UE including the authorized or baseline MA information (e.g., blacklist or whitelist as described above).

In this example, no mobility information is sent to the RAN. Furthermore, no area restrictions are needed as handover is not to be used (e.g., SM class is No PDN connections).

Figure 8:
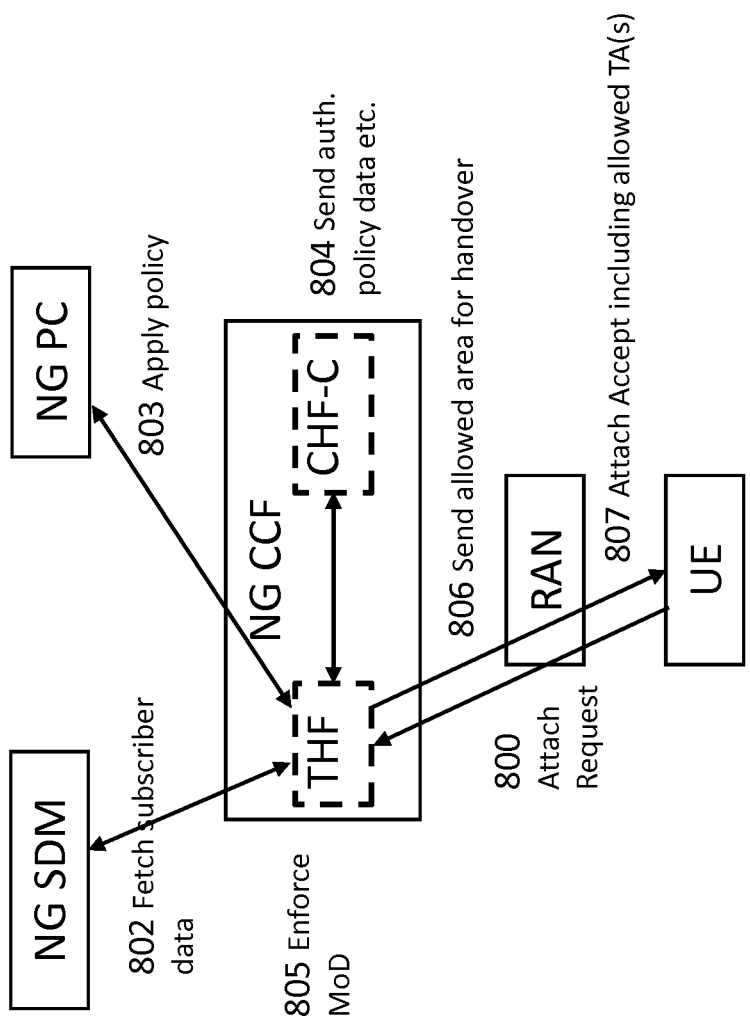

FIG. 8 illustrates an embodiment of a sequence diagram for how the MM class and SM class is used when a fixed wireless access (FWA) UE connects to the network in Attach procedure.

Step 800. The Attach Request is terminated in THF in the CCF.

Step 802. The subscription information for the UE is fetched from the SDM which may include one or more of: a baseline MM class, a baseline SM class, and baseline MA information.

Step 803. The THF requests the PC node for a possible policy to be applied and the authorized values are sent back to the THF. The request sent in step 803 to PC node may include the subscription information obtained in step 802 (e.g., the obtained baseline MM class, SM class and MA information).

Step 804. The THF sends the authorized policy values to the CHF-C.

Step 805. The THF enforces the authorized MoD policies (i.e., MM class and SM class).

Step 806. The THF sends the authorized or baseline MA information (e.g., blacklist or whitelist as described above) to the RAN. As RAN is responsible for initiating the handover, the RAN shall consider the allowed geographical areas when allowing a handover to be triggered.

Step 807. The THF sends Attach Accept message that includes the authorized or baseline MA information (e.g., blacklist or whitelist as described above).

Figure 9:
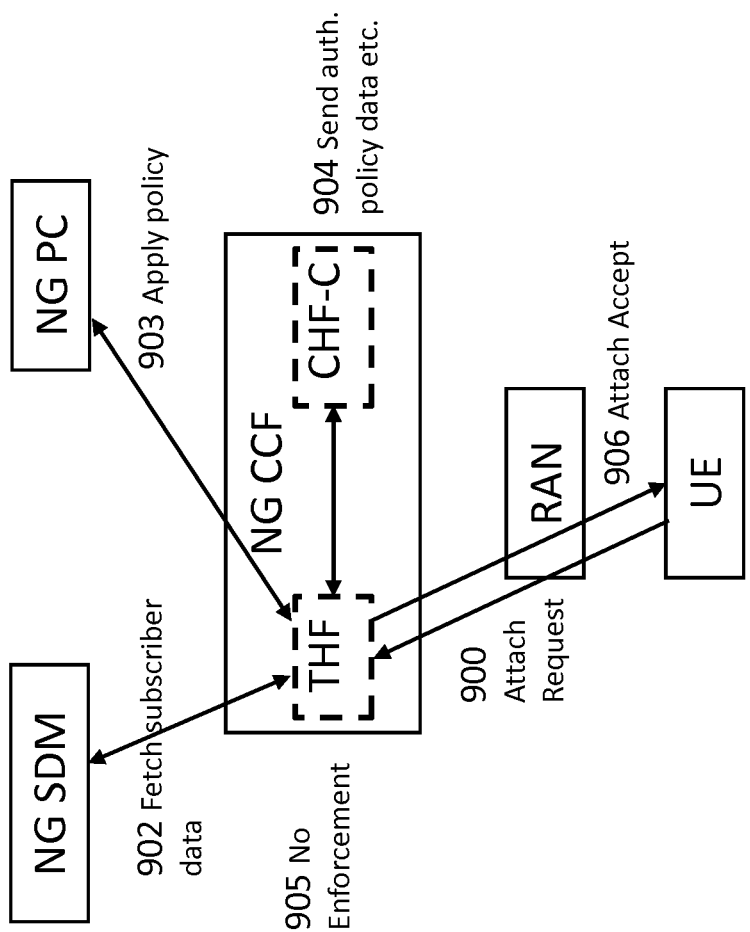

FIG. 9 illustrates an embodiment of a sequence diagram for how the MM class and SM class is used when a mobile broadband (MBB) UE connects to the network in Attach procedure.

Step 900. The Attach Request is terminated in the THF in the CCF.

Step 902. The subscription data is fetched from the SDM including the MM class and the SM class.

Step 903. The THF requests the PC node for a possible policy to be applied and the authorized values are sent back to the THF.

Step 904. The THF sends the authorized policy values to the CHF-C.

Step 905. The THF enforces the authorized Mobility on Demand (i.e., MM class and SM class).

Step 906. The THF sends the Attach Accept message to the RAN. In this scenario, no enforcement is sent to the RAN as no area restrictions applies for handover. In this regard, the THF does not indicate to the UE any allowed geographical areas as no restriction applies due to mobility on demand (e.g., MM class is High).

Figure 10:
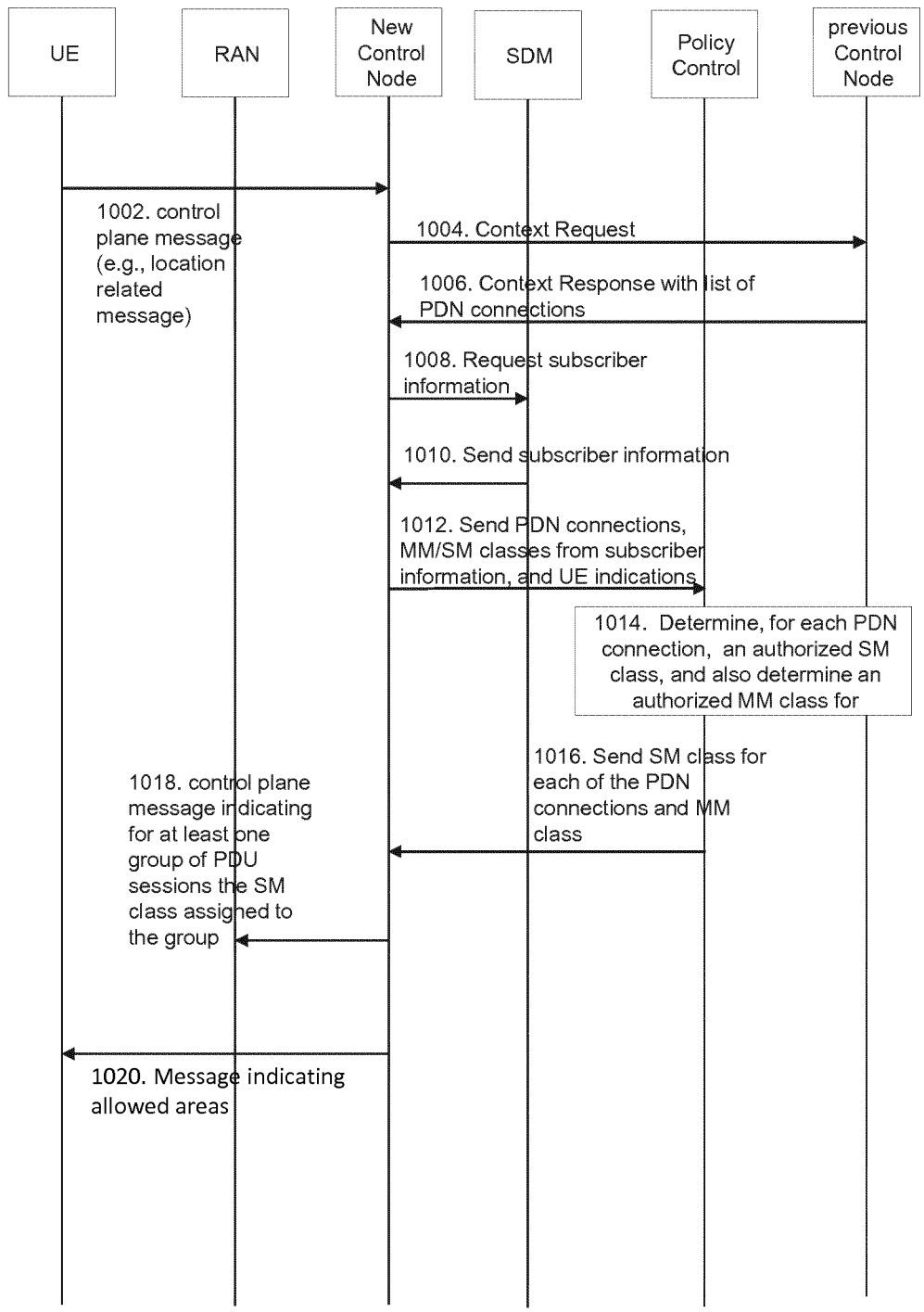
FIG. 10 illustrates an exemplary sequence diagram according to some embodiments.

FIG. 10 illustrates an example mobility enforcement process according to some embodiments. In step 1002, a UE sends a message (e.g., a control plane message such as, for example, a tracking area update message) to a control node (e.g., control node 504), which we have termed the "new" control node to distinguish it from a control node that that previously served the UE (this control node is referred to as the "previous" control node). In step 1004, the new control node sends a context request to the previous control node, which transmits a context response that identifies PDN connections that have been established for the UE. In step 1006, the new control node receives the context response. In step 1008 (which may occur before step 1004), the new control mode transmits a request to a subscription information storage node (in this example the node is an SDM node) for subscriber information associated with the UE. As discussed above, in one embodiment, this subscriber information comprises baseline mobility information that includes an MM class identifier identifying a baseline MM class and an SM class identifier identifying a baseline SM class. The baseline mobility information may also include MA information as described above (e.g., whitelist or blacklist). The SDM, in response to the request, obtains the requested subscriber information and sends it to the new control node. In step 1010, the new control node receives the subscriber information.

In step 1012, the new control node sends to a PC node a request for a policy decision. In some embodiments the request for the policy decision includes information identifying the PDN connection and the baseline mobility information. In some embodiments, the request may further include information the new control node received from the UE, such as information identifying an IP preservation preference (this information may have been included in the message sent in step 1002). Additionally, the request may include context information as described above.

In step 1014, in response to receiving the request, in some embodiments for each identified PDN connection the PC node selects from a set of pre-defined SM classes an authorized SM class and assigns the selected SM class to the PDN connection. Additionally, the PC node may select an authorized MM class and authorized MA information. These selections by the PC node may be based on a policy and context information, if any.

In step 1016, the PC node then sends to the new control node the results of the policy decision. That is, in some embodiments, the PC node transmits to the new control node a message comprising the authorized mobility information (e.g., authorized MM class, authorized per PDN SM classes, and authorized MA information), which message is received by the new control node.

In this example, after receiving the policy decision, the new control node transmits to the RAN node a message indicating for at least one group of PDU sessions the authorized SM class assigned to the PDU sessions (i.e., assigned to the PDN connection to which the group of PDU sessions belongs) (step 1018). For example, in some embodiments, after receiving the policy decision, the new control node determines whether any of the PDN connections have been assigned to a particular SM class (e.g., the "session continuity" class or the "seamless continuity" class). And as a result of determining that the particular SM class has been assigned to a PDN connection, the new control node transmits to the RAN node a message comprising information identifying the PDU session that are associated with the PDN connection to which the particular SM class has been assigned and information indicating that the particular SM class has been assigned to the PDU sessions. More specifically, in one example, in the case that the particular SM class PDU sessions is the "session continuity" class, the message sent to the RAN node may include information indicating that, for the PDU sessions, pre-setup of resources at mobility is not required.

Additionally, in this example, after receiving the policy decision, the new control node transmits to the UE a message containing the baseline MA information or the authorized MA information (step 1020).

Figure 11:
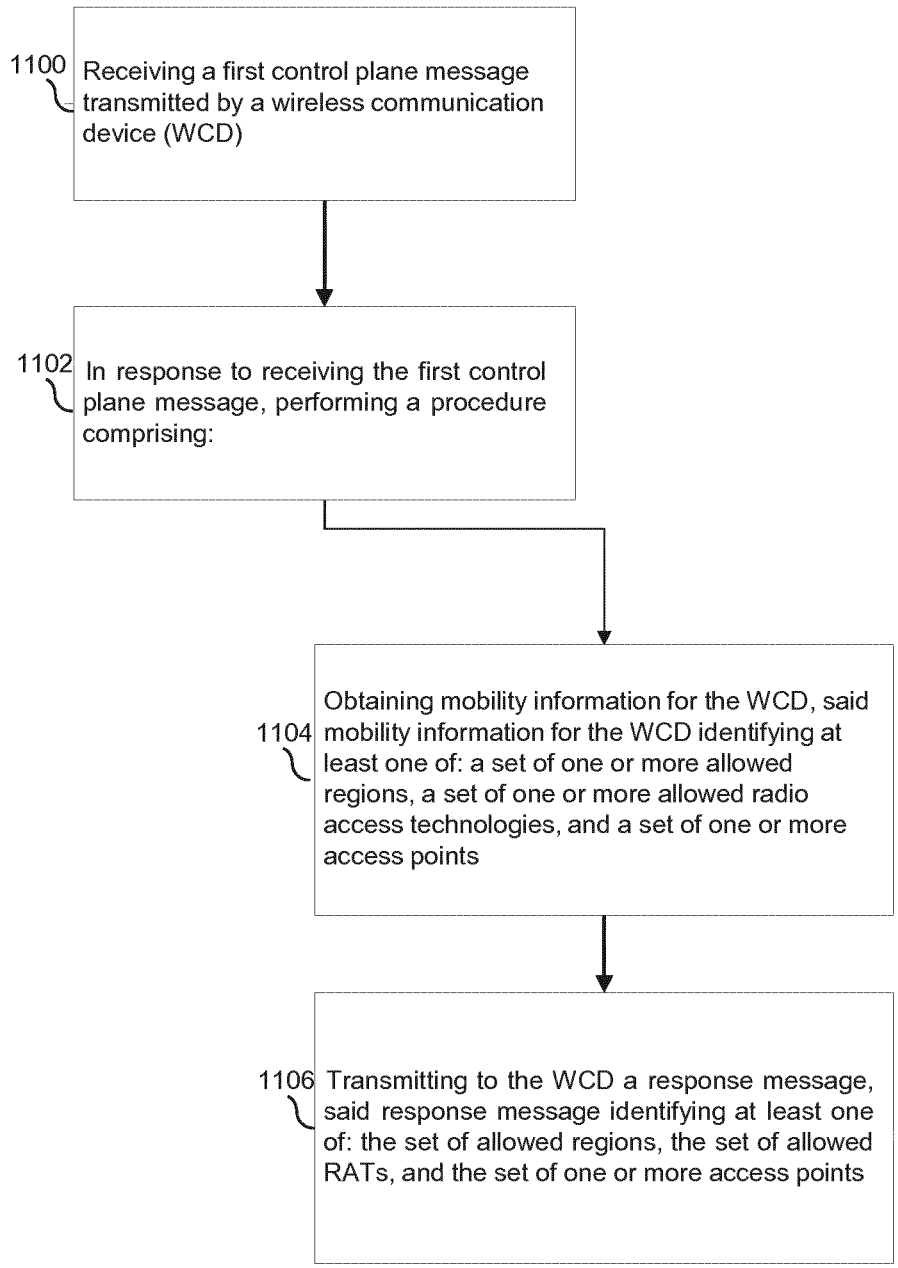
FIG. 11 illustrates an exemplary flow chart according to some embodiments.

FIG. 11 illustrates an embodiment of a process. In some embodiments, the process is performed by a control node such as CCF 504. The process may start at step 1100 where a node receives a first control plane message (e.g. Attach request with or without PDN connectivity request, Tracking Area Update (TAU), Service Request, etc.) transmitted by a wireless communication device (WCD). In response to receiving the first control plane message (step 1102) the process includes the node obtaining mobility information (e.g., a whitelist listing allowed Tracking Areas (TAs), cells, radio access network (RAN) coverage areas, and/or access points or a blacklist listing forbidden TAs, cells, RAN coverage areas, and/or access points) for the WCD, where the mobility information for the WCD identifies (directly or indirectly) at least one of: a set of one or more allowed regions (one or more TAs, one or more cells, one or more access node coverage areas), a set of one or more allowed radio access technologies (RATs), and a set of one or more access points. In step 1104, the node transmits to the WCD a response message, said response message identifying (directly or indirectly) at least one of: the set of allowed regions, the set of allowed RATs, and the set of one or more access points.

Figure 12:
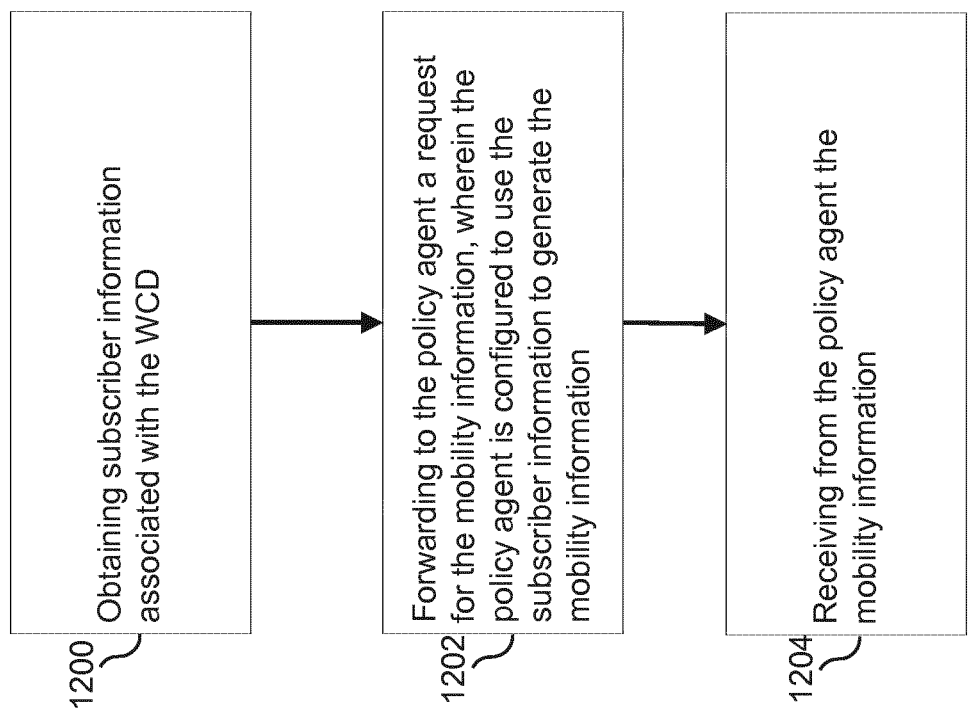
FIG. 12 illustrates an exemplary flow chart according to some embodiments.

FIG. 12 illustrates an embodiment of a process. In some embodiments, the process is performed by a control node such as CCF 504 and further defines the step of obtaining the mobility information (step 1104). In step 1200, the node obtains subscriber information associated with the WCD. In step 1202, the node forwards to the policy node a request for the mobility information, said request for the mobility information comprising the obtained subscriber information, where the policy node is configured to use the subscriber information to generate the mobility information. In step 1204, the node receives from the policy node the mobility information.

Figure 13:
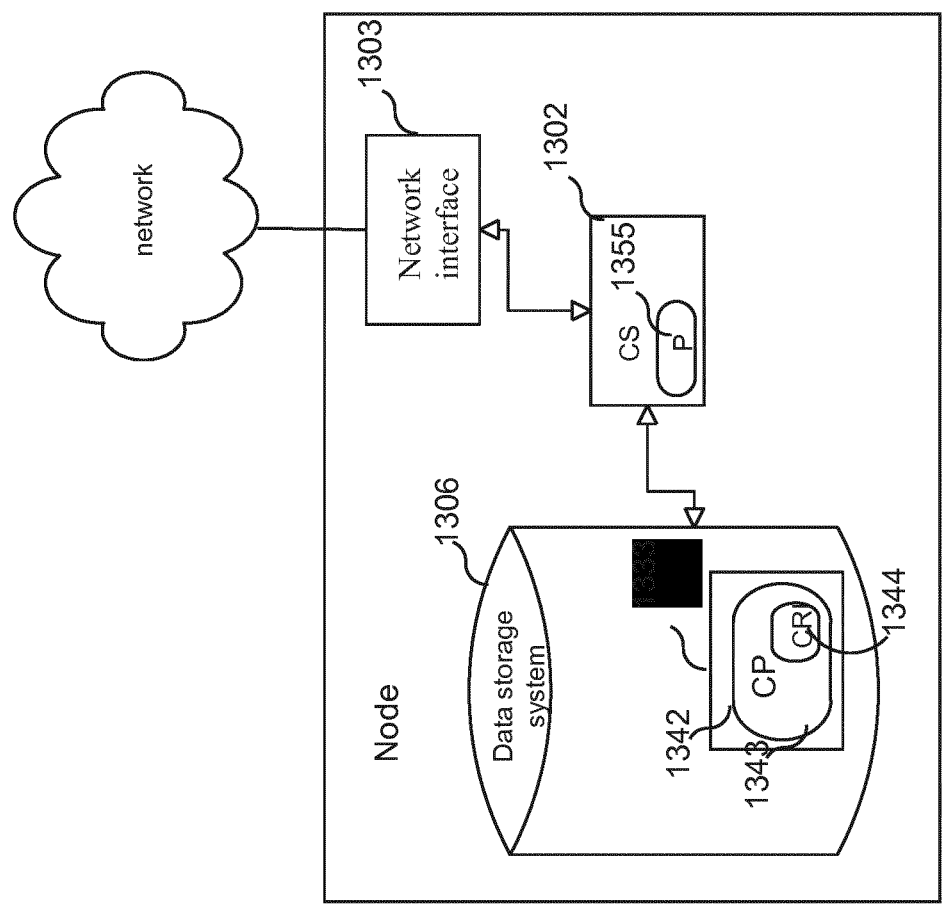
FIG. 13 is a block diagram of a control node according to some embodiments.

FIG. 13 illustrates a block diagram of an exemplary network node such as the CCF 504 or the PC node 508. As shown in FIG. 13, the network node may include or consist of: a computer system (CS) 1302, which may include one or more processors 1355 (e.g., one or more general purpose microprocessors and/or one or more circuits, such as an application specific integrated circuit (ASIC), field-programmable gate arrays (FPGAs), a logic circuit, and the like); a network interface 1303 for use in connecting the network node to a network; and a data storage system 1306, which may include one or more non-volatile storage devices and/or one or more volatile storage devices (e.g., random access memory (RAM)). In embodiments where the network node includes a microprocessor, a computer program product (CPP) 1333 may be provided. CPP 1333 includes or is a computer readable medium (CRM) 1342 storing a computer program (CP) 1343 comprising computer readable instructions (CRI) 1344. CRM 1342 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1344 of computer program 1343 is configured such that when executed by computer system 1302, the CRI causes the network node to perform steps described above (e.g., steps described above with reference to the flow charts and message flows shown in the drawings). In other embodiments, the network node may be configured to perform steps described herein without the need for a computer program. That is, for example, computer system 1302 may consist merely of one or more ASICs. Hence, the features of the embodiments described herein may be implemented in hardware and/or software.

Embodiments disclosed herein provide a mechanism for mobility enforcement of a subscriber including one or more of (i) a mobility white-list from THF to RAN which gives the 'allowed mobility area' for handover and possibility to change this dynamically even in connected mode; (ii) a mobility white-list from THF to UE which gives the 'allowed mobility area' for registration attempts and possibility to change this dynamically even in connected mode; (iii) a no handover allowance indication from THF to RAN applicable on a UE level and possibility to change this dynamically even in connected mode; (iv) a no handover allowance indication from THF to RAN applicable per individual PDU session and possibility to change this dynamically even in connected mode; and (v) the ability for a UE in connected mode to selectively request setup of PDU session(s) not yet being active. The embodiments are applicable both for a non-roaming and roaming scenarios.

Advantages of the embodiments disclosed herein include an efficient solution on how to allow access for a UE in only parts of the serving nodes service area. Further advantages includes unwanted registration attempts from a UE, avoiding handover attempts into areas that are not allowed, and attempting handover for only PDU sessions that are granted an appropriate service level. Additional advantages include a selective service request from a UE to setup only a part of the PDU sessions also while being in the connected mode for another session. The embodiments disclosed herein give a way for the operators to offer subscriptions for different service level demands and to enforce the rules connected to the different service levels. The embodiments disclosed herein further give a way for the vendors to offer licenses for different subscriber categories served by the same node function avoiding price erosion.

While various embodiments of the present disclosure are described herein, it should be understood that they have been presented by way of example only, and not limitation. Thus, the breadth and scope of the present disclosure should not be limited by any of the above described exemplary embodiments. Moreover, any combination of the above-described elements in all possible variations thereof is encompassed by the disclosure unless otherwise indicated herein or otherwise clearly contradicted by context. Further, it is understood that the term node in this application can also be understood as entity.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

CONCISE DESCRIPTION OF EMBODIMENTS

1. A method for mobility enforcement, the method comprising:
  receiving a first control plane message (e.g. Attach request with or without PDN connectivity request, Tracking Area Update (TAU), Service Request, etc.) transmitted by a wireless communication device (WCD); and
  in response to receiving the first control plane message, performing a procedure comprising:
    obtaining mobility information (e.g., a whitelist listing allowed Tracking Areas (TAs), cells, radio access network (RAN) coverage areas, and/or access points or a blacklist listing forbidden TAs, cells, RAN coverage areas, and/or access points) for the WCD, said mobility information for the WCD identifying (directly or indirectly) at least one of: a set of one or more allowed regions (one or more TAs, one or more cells, one or more access node coverage areas), a set of one or more allowed radio access technologies (RATs), and a set of one or more access points; and
    transmitting to the WCD a response message, said response message identifying (directly or indirectly) at least one of: the set of allowed regions, the set of allowed RATs, and the set of one or more access points.

2. The method of embodiment 1, wherein the step of obtaining the mobility information comprises obtaining authorized mobility information from a policy node.

3. The method of embodiment 2, wherein the step of obtaining the authorized mobility information from the policy node comprises:
  obtaining subscriber information associated with the WCD, said subscriber information comprising (or consisting of) baseline mobility information;
  forwarding to the policy node a request for the authorized mobility information, said request for the authorized mobility information comprising the obtained subscriber information, wherein the policy node is configured to generate the authorized mobility information (e.g., policy node may generate the authorized mobility information by selecting authorized mobility information using a policy and context information); and
  receiving from the policy node the authorized mobility information.

4. The method of embodiment 1, wherein the obtained mobility information is baseline mobility information, and the step of obtaining the mobility information comprises obtaining subscription information for the WCD.

5. The method of embodiment 4, wherein the subscription information comprises baseline mobility information.

6. The method of embodiment 4 or 5, wherein the step of obtaining the mobility information further comprises transmitting to a policy node the obtained subscription information for the WCD and then receiving from the policy node the mobility information.

7. The method of embodiment 3, 4 or 6, wherein the subscriber information comprises:
  baseline mobility management (MM) information identifying one of a predefined set of MM classes;
  baseline session management (SM) information identifying one of a predefined set of SM classes.

8. The method of embodiment 7, wherein the mobility information comprises:
  MM information identifying an authorized MM class; and
  SM information identifying one or more authorized SM classes.

9. The method of any one of the embodiments 2, 3, and 6-8, wherein
  the method further comprises the policy node selecting an authorized SM class for a PDN connection currently set up for the WCD, and
  the mobility information includes an SM class identifier that identifies said selected SM class for the PDN connection.

10. The method of embodiment 9, wherein the step of selecting an authorized SM class for a PDN connection currently set up for the WCD comprises performing the selection based on context information.

11. The method of embodiment 10, wherein the context information comprises one or more of:
  location information identifying location of the WCD and time-of-day information identifying the current time of day.

12. The method of any one of embodiments 1-10, wherein the procedure further comprises:
  transmitting to a RAN node currently serving the WCD a message identifying (directly or indirectly) at least one of: the set of allowed regions, the set of allowed RATs, and the set of one or more access points.

13. The method of any one of embodiments 1-12, wherein
  the WCD is currently using at least one PDN connection, said PDN connection being associated with a set of one or more PDU sessions,
  the obtained mobility information comprises an authorized SM class for the PDN connection, and
  the procedure further comprises:
    determining whether the SM class for the PDN connection is particular SM class, and as a result of determining that the SM class for the PDN connection is the particular SM class, transmitting to a RAN node a message indicating that pre-setup of resources at mobility is not required for any of said PDU sessions.

14. The method of embodiment 13, further comprising: receiving a request from the UE in the UE in the connected mode for setup of bearers that are assigned a SM class that is not subject to pre-setup of resources.

15. The method according to embodiment 7, wherein the predefined set of MM classes includes one or more of (ordered with increasing restriction on the allowed regions) (i) an unlimited mobility class, (ii) a medium mobility class, (iii) a low mobility class, and a (iv) no mobility class.

16. The method according to embodiment 7, wherein the predefined set of SM classes includes one or more of (i) a seamless continuity class, (ii) service continuity class, (iii) a session continuity class, and a (iv) no PDN connection class.

17. A control node configured to perform the method of any one of the embodiments 1-16.

18. A computer program comprising instructions for performing the method of any of the embodiments 1-16.

ABBREVIATIONS

CCF Core Control Function
CHF Control Handling Function (a part of NG Core Control)
CHF-C Control Handling Function Control Plane (a part of CHF)
CHF-U Control Handling Function User Plane (a part of CHF)
EPC Evolved Packet Core
FWA Fixed Wireless Access
HRL Handover Restriction list
IoT Internet of Things
LTE Long Term Evolution (a 4G mobile network)
MA Mobility Area
MBB Mobile Broadband
MM Mobility Management
MME Mobility Management Entity
MOD Mobility On Demand
NG Next Generation mobile network i.e. 5G
NG PC Next Generation Policy Control
PC Policy Control
PDN Packet Data Network
PDU Packet Data Unit
PGW Packet Gateway
RAN Radio Access Node
RAT Radio Access Technology
SDM Subscriber Data Management
SM Session Management
TA Tracking Area
TAU Tracking Area Update
THF Traffic Handling Function (a part of NG Core Control)
UE User Equipment
WCD Wireless Communication Device

The invention claimed is:

1. A method for mobility enforcement performed by a control entity, the method comprising:
receiving a first control plane message transmitted by a wireless communication device (WCD);
in response to receiving the first control plane message, performing a procedure comprising:
sending to a policy node a request for authorized mobility information for the WCD;
receiving a message transmitted by the policy node in response to the request, the message comprising at least authorized mobility area (MA) information for the WCD, said authorized MA information for the WCD comprising at least one of: i) a list of region identifiers each identifying an allowed region or a disallowed region or ii) radio access technology (RAT) information identifying a set of one or more allowed RATs or a set of one or more disallowed RATs; and
transmitting towards the WCD a response message, said response message comprising the authorized MA information obtained from the policy node, which authorized MA information comprises at least one of: i) the list of region identifiers each identifying an allowed region or a disallowed region or ii) the RAT information identifying the set of allowed RATs or the set of disallowed RATs; and
obtaining subscription information for the WCD, wherein the subscription information comprises baseline mobility information,
the request for the authorized mobility information comprises the obtained subscription information for the WCD,
the subscription information comprises (i) baseline mobility management (MM) information identifying one of a predefined set of MM classes, and (ii) baseline session management (SM) information identifying one of a predefined set of SM classes,
the mobility information for the WCD comprises (i) MM information identifying an authorized MM class and (ii) SM information identifying one or more authorized SM classes.

2. The method of claim 1, wherein
the first control plane message is an Attach request, a Tracking Area Update, or a Service Request, and
said authorized MA information for the WCD is: i) a whitelist listing identifiers identifying allowed Tracking Areas (TAs), allowed cells, and/or allowed radio access network (RAN) coverage areas, or ii) a blacklist listing identifiers identifying forbidden TAs, forbidden cells, and/or forbidden RAN coverage areas.

3. The method of claim 1, the method further comprising:
obtaining subscriber information associated with the WCD, said subscriber information comprising baseline mobility information, wherein
said request for the authorized mobility information comprises the obtained subscriber information.

4. The method of claim 3, wherein
the policy node is configured to generate the authorized mobility information by selecting the authorized mobility information using a policy and context information, and
the context information comprises location information identifying location of the WCD and/or time-of-day information identifying the current time of day.

5. The method of claim 1, wherein the procedure further comprises:
transmitting to a RAN node currently serving the WCD a message identifying, at least one of: the list of allowed regions, the list of disallowed regions, the set of disallowed RATs, or the set of allowed RATs.

6. The method of claim 1, wherein
the WCD is currently using at least one PDN connection, said PDN connection being associated with a set of one or more Packet Data Unit (PDU) sessions, and
the message received from the policy node comprises an authorized SM class for the PDN connection.

7. A non-transitory computer readable medium including a computer program comprising instructions for performing the method of claim 1.

8. The method of claim 1, wherein the list of allowed regions comprises one or more tracking areas (TAs), one or more cells, or one or more access node coverage areas.

9. The method of claim 1, wherein said authorized MA information for the WCD includes a list of region identifiers each identifying an allowed region or a disallowed region.

10. A method for mobility enforcement performed by a wireless communication device (WCD), the method comprising,
transmitting a first control plane message towards a control entity; and receiving a response message transmitted by the control entity, wherein the response message comprises mobility information for the WCD and said mobility information for the WCD includes at least one of: i) a list of region identifiers each identifying an allowed region or a disallowed region or ii) RAT information identifying the set of allowed RATs or the set of disallowed RATs, wherein the mobility information for the WCD comprises authorized mobility area (MA) information received from a policy node, baseline mobility information, and subscription information, the subscription information comprises the baseline mobility information, the subscription information comprises (i) baseline mobility management (MM) information identifying one of a predefined set of MM classes and (ii) baseline session management (SM) information identifying one of a predefined set of SM classes, the mobility information for the WCD comprises (i) MM information identifying an authorized MM class and (ii) SM information identifying one or more authorized SM classes.

11. The method of claim 10, wherein the first control plane message is an Attach request, a Tracking Area Update, or a Service Request.

12. The method of claim 10, wherein the mobility information is i) a whitelist listing identifiers identifying allowed Tracking Areas (TAs), allowed cells, and/or allowed radio access network (RAN) coverage areas, or ii) a blacklist listing identifiers identifying forbidden TAs, forbidden cells, and/or forbidden RAN coverage areas.

13. The method of claim 10, wherein
the WCD is in connected mode, and
the method further comprises:
transmitting a request to the control entity for setup of bearers that are assigned a SM class that is not subject to pre-setup resources.

14. The method of claim 10, wherein
the WCD is currently using at least one PDN connection, said PDN connection being associated with a set of one or more Packet Data Unit (PDU) sessions; and
the mobility information for the WCD comprises an authorized SM class for the PDN connection.

15. The method of claim 10, wherein the list of allowed regions comprises one or more TAs, one or more cells, or one or more access node coverage areas.

16. The method of claim 10, wherein said mobility information for the WCD includes a list of region identifiers each identifying an allowed region or a disallowed region.

* * * * *